US006655228B1

(12) United States Patent
Margherio et al.

(10) Patent No.: US 6,655,228 B1
(45) Date of Patent: Dec. 2, 2003

(54) DUAL DIRECTIONAL POWER FEED

(75) Inventors: David Margherio, Ladd, IL (US); Donald J. Borelli, Mendota, IL (US)

(73) Assignee: Spartan Tool, L.L.C., Mendota, IL (US)

( * ) Notice: Subject to any disclaimer, the term of this patent is extended or adjusted under 35 U.S.C. 154(b) by 4 days.

(21) Appl. No.: 09/900,658

(22) Filed: Jul. 6, 2001

(51) Int. Cl.[7] .............................. F16H 1/24; B08B 1/02

(52) U.S. Cl. ................................ 74/424.81; 74/424.73; 74/424.77; 74/424.91; 74/25; 15/104.33

(58) Field of Search .................... 74/89, 89.34, 424.73, 74/424.77, 424.78, 424.81, 424.89, 424.91, 424.92, 424.93, 25; 15/104.31, 104.33

(56) References Cited

U.S. PATENT DOCUMENTS 2,262,364 A * 11/1941 Hugel et al. ............... 166/77.1
3,224,024 A * 12/1965 Hunt ....................... 15/104.33
3,394,599 A * 7/1968 Tucker .......................... 74/25
4,191,059 A * 3/1980 Vanslette ....................... 74/25
4,246,802 A * 1/1981 Rasmussen et al. ........... 74/25
4,317,382 A * 3/1982 Riser ............................. 74/25
4,395,791 A * 8/1983 Irwin ...................... 15/104.33
4,570,281 A 2/1986 Boelens
4,580,306 A * 4/1986 Irwin ...................... 15/104.33
4,726,242 A * 2/1988 Baghdasarian ................. 74/89
5,031,276 A * 7/1991 Babb et al. .............. 15/104.33
5,507,062 A * 4/1996 Salecker .................. 15/104.33
5,640,736 A 6/1997 Salecker
5,901,401 A * 5/1999 Rutkowski et al. ...... 15/104.33

* cited by examiner

*Primary Examiner*—William C Joyce
*Assistant Examiner*—Timothy McAnulty
(74) *Attorney, Agent, or Firm*—McDermott, Will & Emery

(57) ABSTRACT

The present invention discloses a dual directional power feed for use with handheld drills or stationary frame mounted power sources. The device comprises a housing, two pairs of wheel bearings rotatably mounted to the housing, a cap rotatably mounted to the housing, and a biasing bearing rotatably mounted to the cap. The cap is rotatable to a first position such that rotation of the threaded cable in a first direction causes the threaded cable to translate along its longitudinal axis in a first direction. The cap is further rotatable to a second position such that rotation of the threaded cable in the first direction causes the threaded cable to translate along its longitudinal axis in a second direction, opposite the first direction. Further, the present invention discloses a bearing and support assembly for coupling a power feed device to a power unit comprising a support plate and a bearing.

23 Claims, 9 Drawing Sheets

DUAL DIRECTIONAL POWER FEED

FIELD OF THE INVENTION

The present invention relates generally to a power feed device for sewer and drain cleaning cables. Specifically, the present invention relates to a dual directional power feed device for feeding a cable in a first direction out of the device, or in a second direction into the device. Further, the dual directional power feed device can be mounted to a power unit, such as a stationary frame power unit or a handheld power unit. Additionally, a support plate is provided for coupling the power feed device to the power unit.

BACKGROUND OF THE INVENTION

Rotary powered drain cleaners are well known in the art. Generally, they have employed a power source, attached to a housing unit containing a sewer and drain cleaning cable having a small diameter. Generally, one end of the cable has been fed from inside the housing unit, through a feed device, which could control the speed and direction in which the cable could be fed, i.e., into or out of a sewer drain or into or out of the housing.

Rotary powered drain cleaners can be either handheld devices or stand-alone devices, i.e., frame mounted devices. Handheld power feed devices have commonly employed an electric drill or similar device as the power source, while stand-alone devices have commonly used rotatable drums as the power source. In either case, the power source has rotated the cable, enabling the cable to feed into or out of the housing unit. In addition to being fed by the power source, the cable could generally additionally been fed from the housing unit by hand.

Compared to unidirectional feed devices, the dual directional feed devices increased the number of moving components, thereby increasing the cost of the device, as well as increasing the amount of maintenance the device required, such as cleaning, greasing, and replacing worn parts. For example, rotary powered drain cleaners that have achieved dual directional feeding have used a plurality of rotating rollers that needed to be reconfigured or repositioned for dual directional feeding. Previous devices have included a pair of rotating rollers to engage a threaded cable such that rotation of the cable in a first direction causes the cable to translate along it's axis in a first direction. In order for these devices to cause the threaded cable to translate in a second direction opposite the first direction, each of the rollers that engage the cable must be reconfigured by individually rotating each roller to a new position.

Prior rotary powered drain cleaners have been coupled to power sources by mounting directly to the frame or structure of the power source. However, previous mounting methods and devices have been a source of safety concerns for rotary powered drain cleaner operators. For example, in the past, when a guide tube for a rotating cable had been attached to the power source, the guide tube could bind and wrap around an operator's hand when the rotating cable within the guide tube would snag. Thus, previous rotary powered drain cleaners posed a safety hazard to their operators.

SUMMARY OF THE INVENTION

It is one of the principal objectives of the present invention to provide a power feed device capable of dual directional operation.

It is another objective of the present invention to provide a power feed device capable of dual directional operation wherein the cable need only rotate in one direction to accomplish dual directional feeding.

It is yet another objective of the present invention to provide a power feed device capable of regulating the speed at which the cable feeds through the device.

It is still another objective of the present invention to provide a dual directional power feed device capable of being used with either a handheld drill or a stationary frame mounted power source.

It is a further objective of the present invention to provide a bearing and support assembly for coupling a device to a power unit whereby the assembly can be configured such that the power unit may rotate without causing the device to rotate as well.

It is still further an objective of the present invention to provide a bearing and support assembly for coupling a device to a power unit whereby the assembly can be configured such that both the power unit and the device may rotate independently of each other.

It is still another object of the present invention to provide a dual direction power feed device with fewer moving components that require less maintenance than prior dual directional power feed devices.

These and other objectives of the present invention will become apparent upon examining the drawings and figures together with the accompanying written description thereof.

DETAILED DESCRIPTION OF THE DRAWINGS

The present invention relates generally to a power feed device 10 for sewer and drain cleaning cables. Specifically, the present invention relates to a dual directional power feed device 10 for feeding a cable in a first direction, or in a second direction opposite the first direction. The following detailed description of the drawings describes the use of the present invention with a stationary frame power unit. The present invention can also be used with a handheld power unit.

Figure 1:
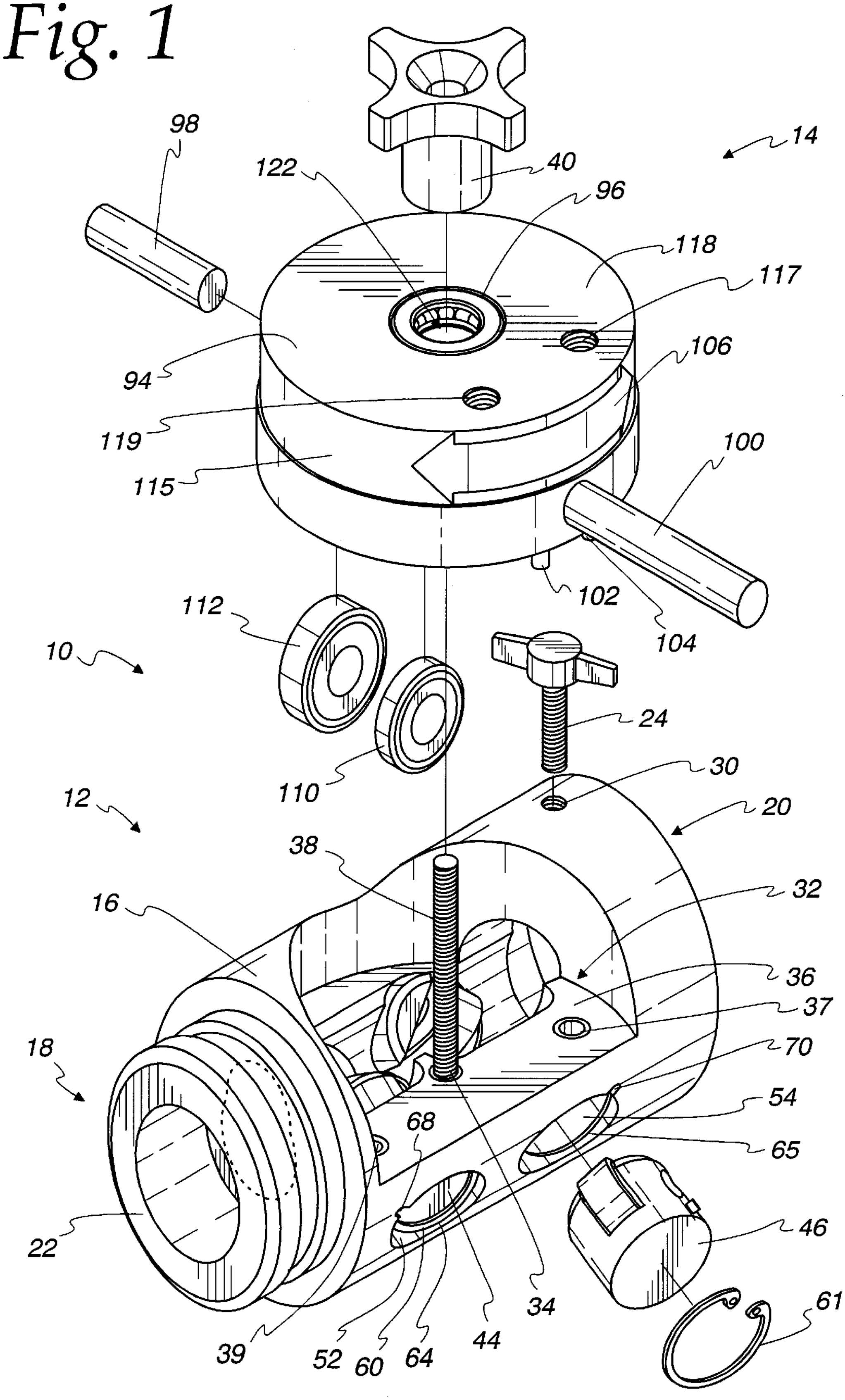
FIG. 1 is a partially exploded front perspective view of the dual directional power feed.
Figure 2:
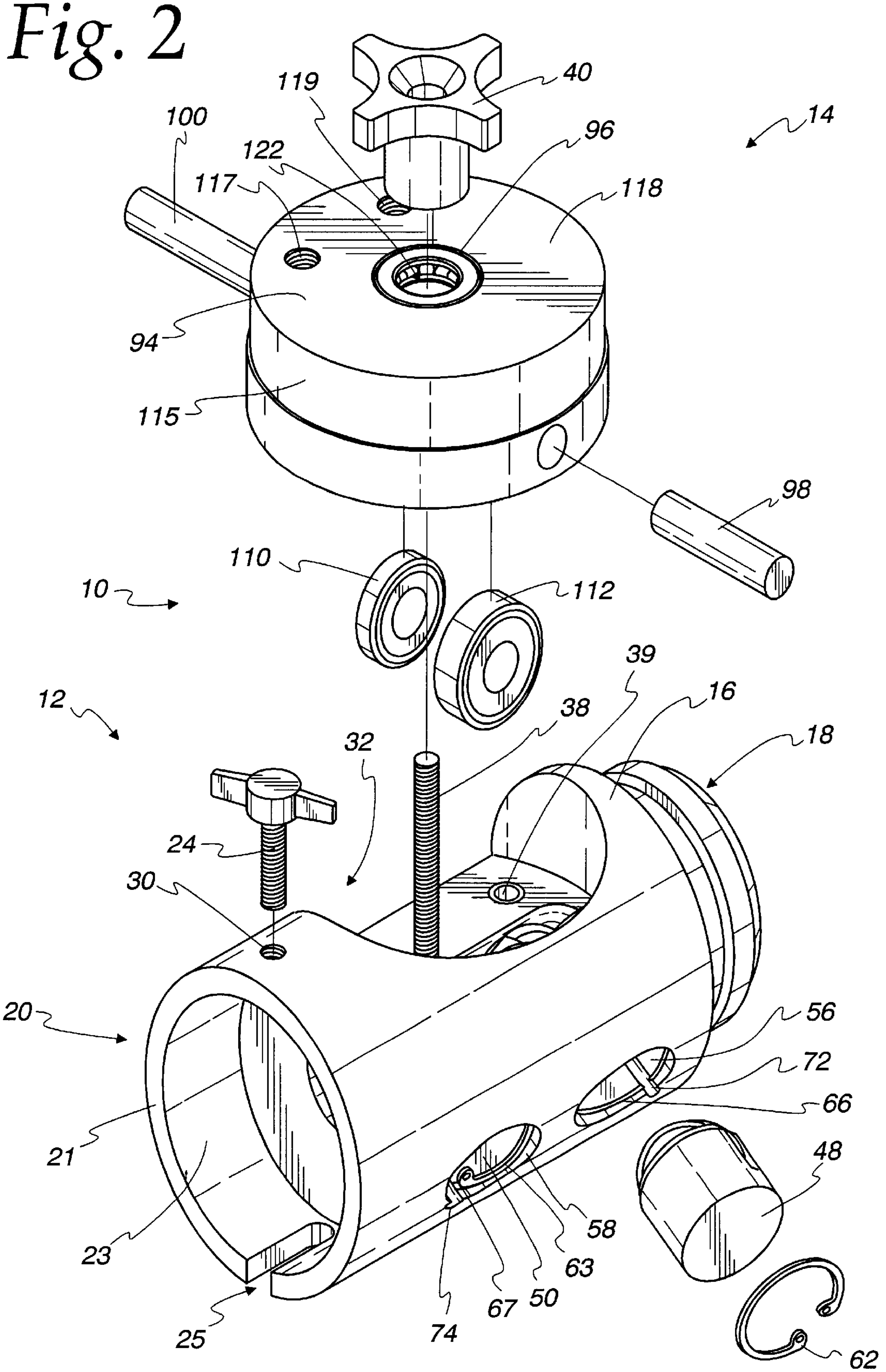
FIG. 2 is a partially exploded rear perspective view of the dual directional power feed.

FIG. 1 depicts one embodiment of the power feed device 10. As shown in FIG. 1, the power feed device 10 has a housing assembly 12 and a cap assembly 14. The housing assembly 12 includes a housing 16. The housing 16 is generally cylindrical with a male end 18, as shown in FIG. 1, and a female end 20, as shown in FIG. 2. The housing 16 is preferably constructed of aluminum. However, the housing 16 may be constructed of any material as would be apparent to one with skill in the art. For example, the housing 16 may be constructed of a rigid synthetic material such as a plastic.

As shown in FIG. 1, the housing assembly 12 further includes an end cap 22 that attaches to the male end 18 of the housing 16. The end cap 22 is preferably constructed of an engineering plastic such as the acetal resin sold under the trademark Delrin®. Alternatively, the end cap 22 can be constructed of rubber, plastic, or other synthetic material suitable to prevent the power feed device 10 from marring the finish of the sink, toilet, or other drain in which the power feed device 10 is to be operated. In the embodiment shown, the end cap 22 is permanently secured to the aluminum housing 16 using an adhesive such as an epoxy. The housing 16 and the end cap 22 may be attached using other materials or methods as long as the material or method used to secure the end cap 22 to the housing 16 is capable of permanently binding together the materials the end cap 22 and the housing 16 are constructed from. When the end cap 22 is secured to the male end 18 of the housing 16, the male end 18 of the housing 16 is configured to couple with a guide hose assembly 26 (FIGS. 11 and 12) or similarly configured device or attachment.

Figure 9:
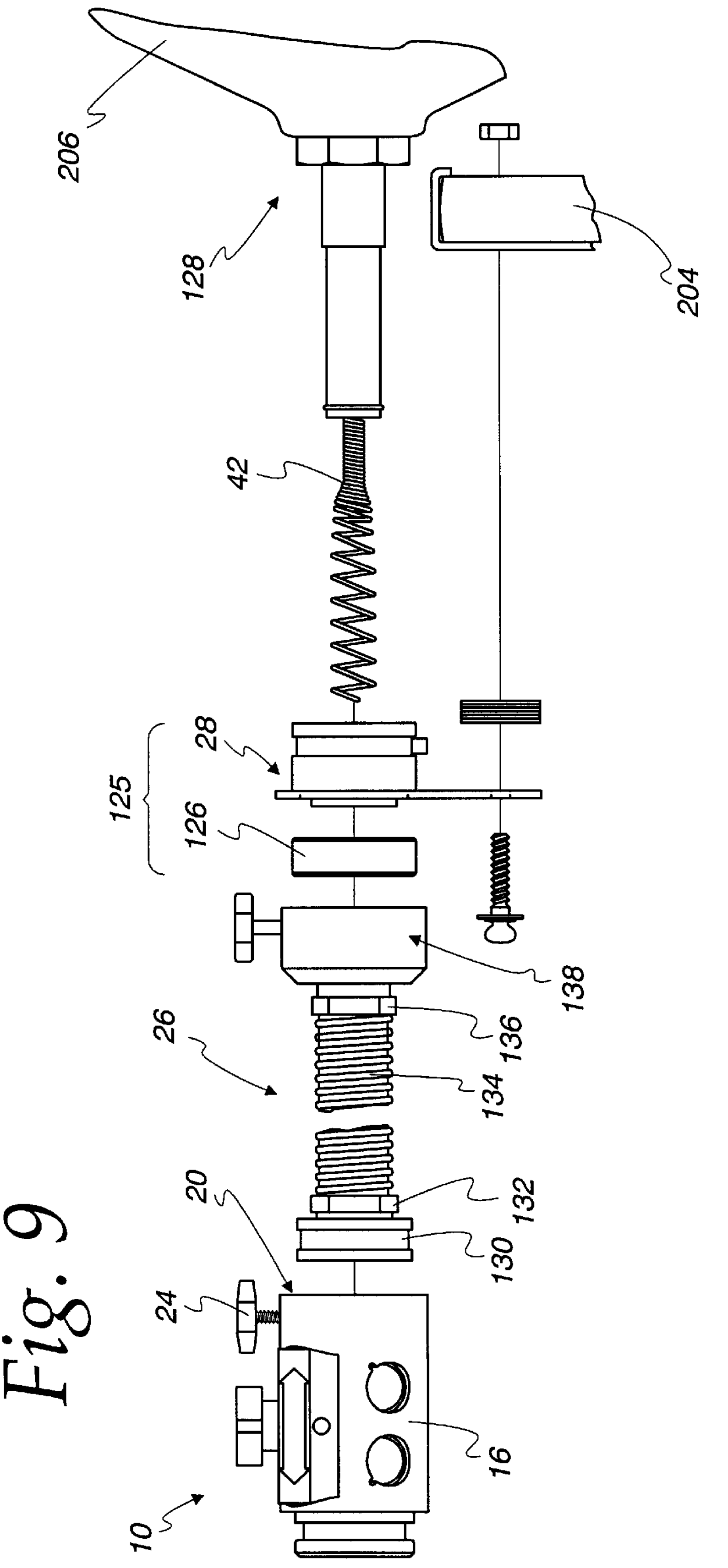
FIG. 9 is a partially exploded side view of a system including the dual directional power feed, a guide hose assembly, a bearing and support assembly, and a drum assembly.
Figure 10:
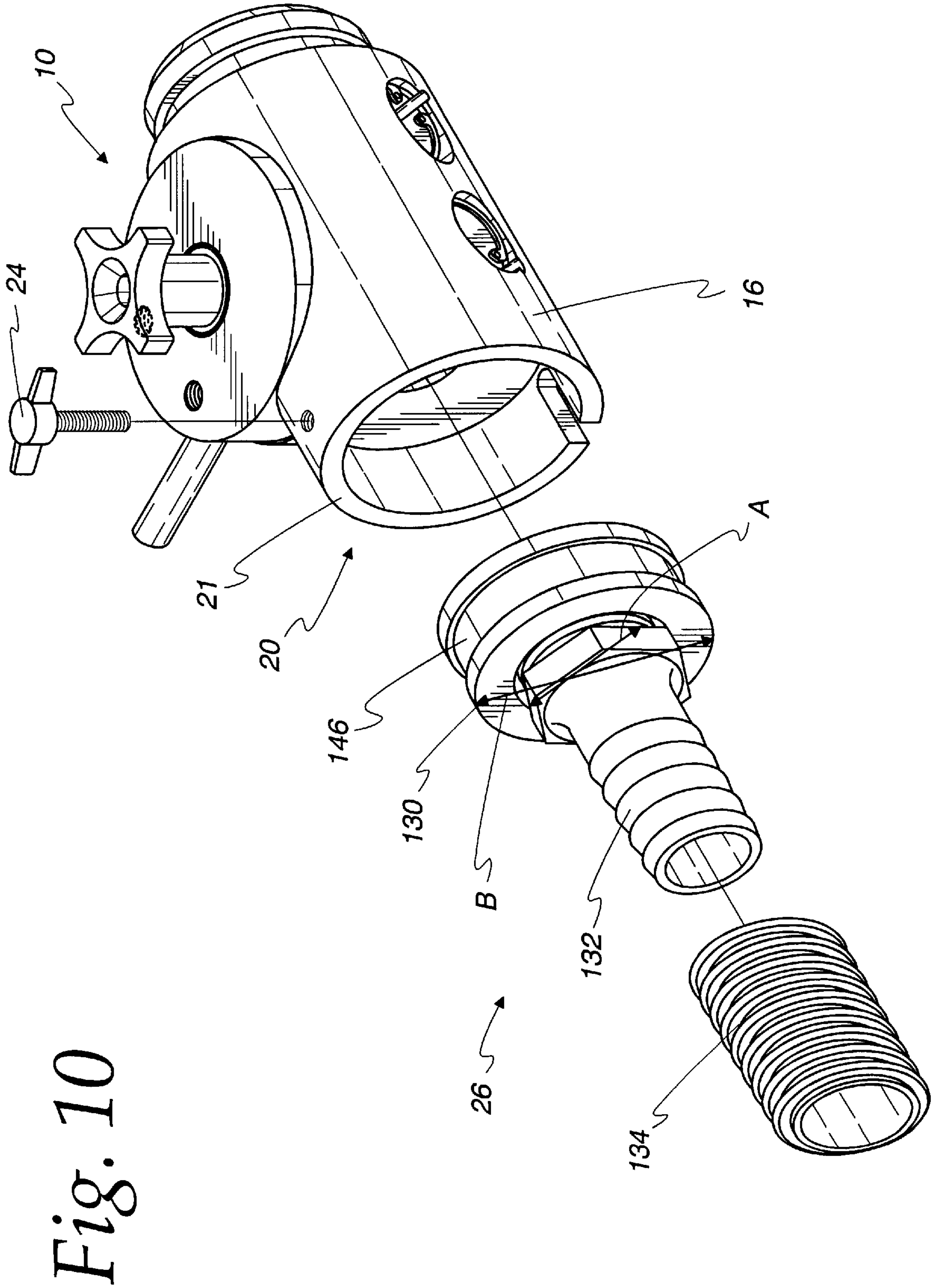
FIG. 10 is a partially exploded perspective view of the dual direction power feed device and a power feed collar of a guide hose.
Figure 11:
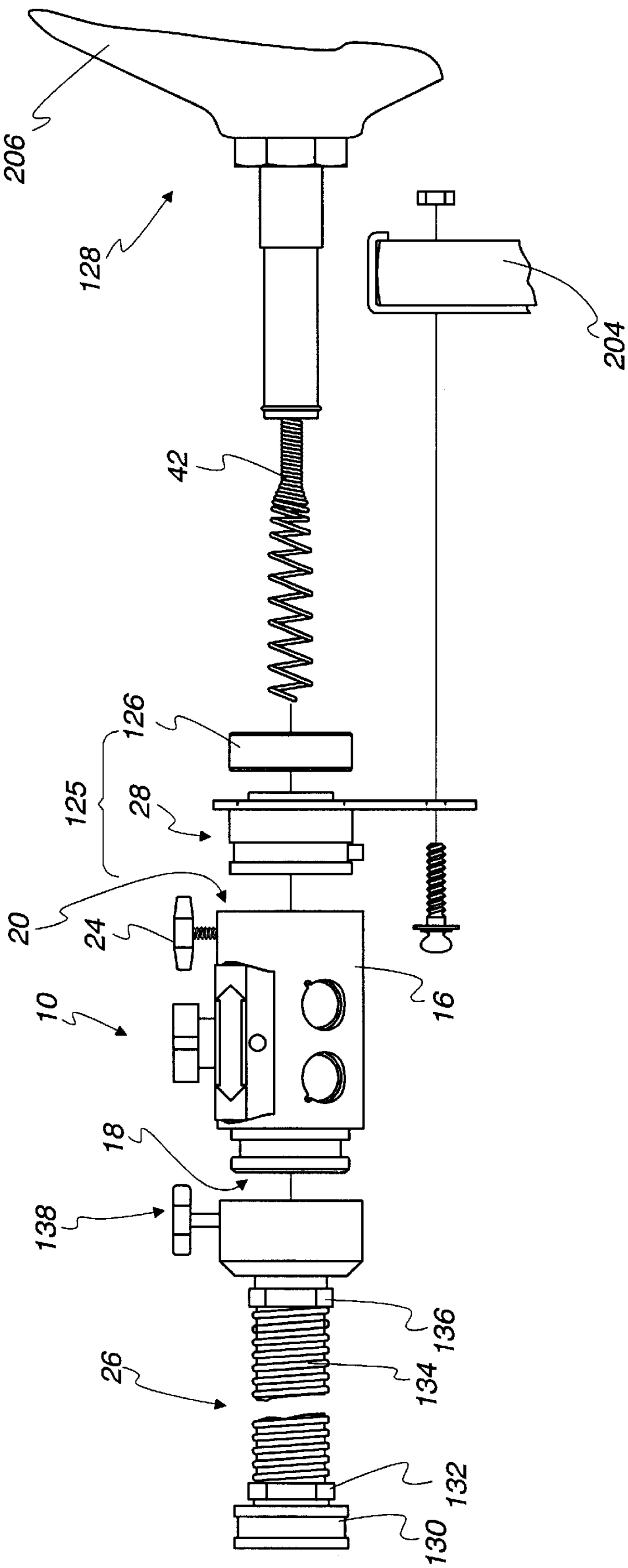
FIG. 11 is a partially exploded side view of a system including the guide hose assembly, the dual directional power feed, the bearing and support assembly, and a drum assembly.
Figure 13:
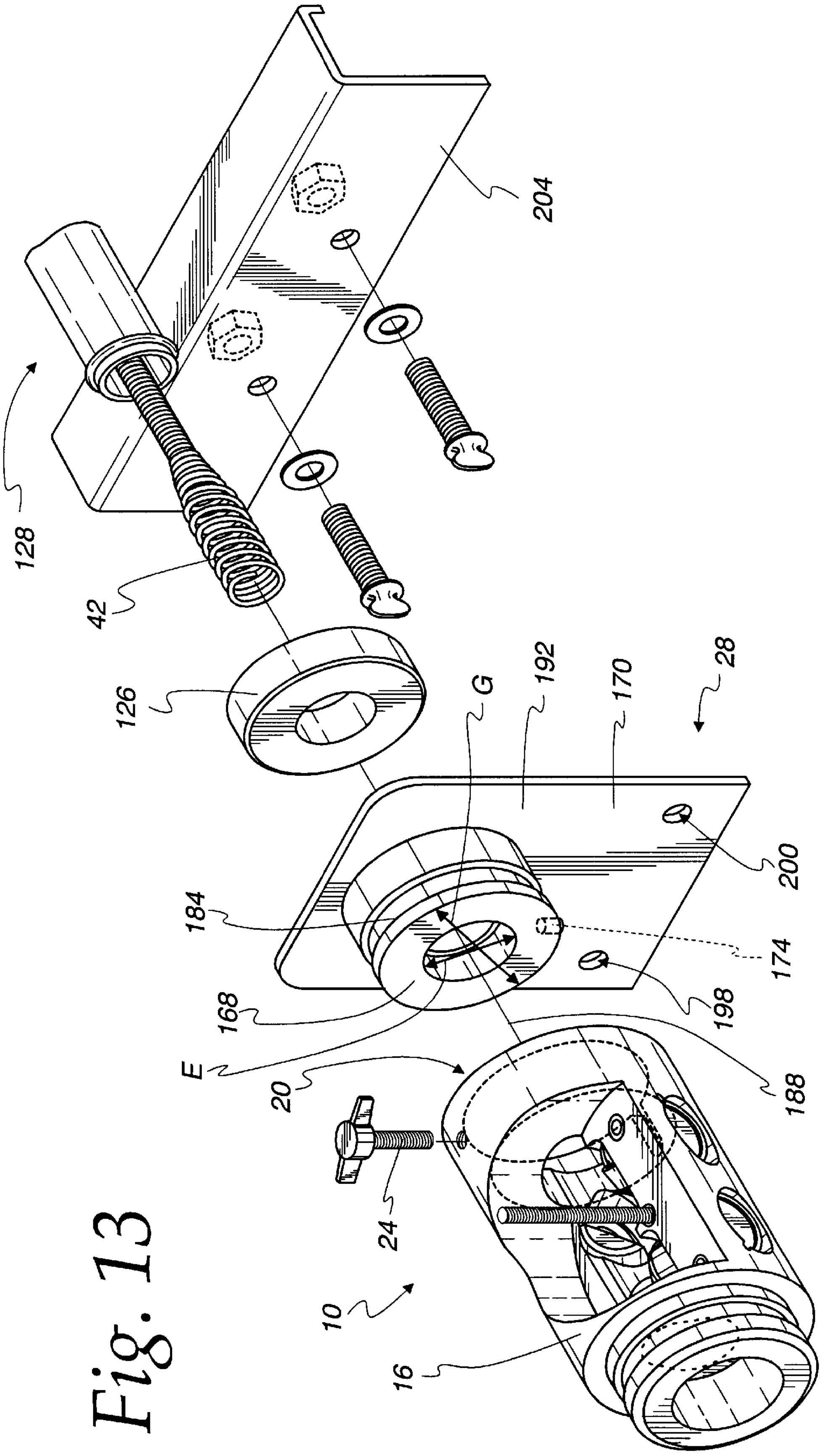
FIG. 13 is a partially exploded perspective view of a system including the dual direction power feed and the bearing and support assembly.

As shown in FIG. 2, the female end 20 of the housing 16 has an annular wall 21 with and annular surface 23 for coupling the housing 16 to an attachment as described below. A thumbscrew 24 can be threaded through a screw hole 30 in the annular wall 21 so that it extends into the area bound by the annular wall 21 of the female end 20 of the housing 16. The female end 20 of the housing 16 is configured to couple with a guide hose assembly 26 (as shown in FIGS. 9 and 10), a support plate 28 (as shown in FIGS. 11 and 13), or similarly configured device or attachment as described below. The female end 20 of the housing 16 further includes a guide tube notch 25 for engaging the support plate 28 as described below.

Figure 7:
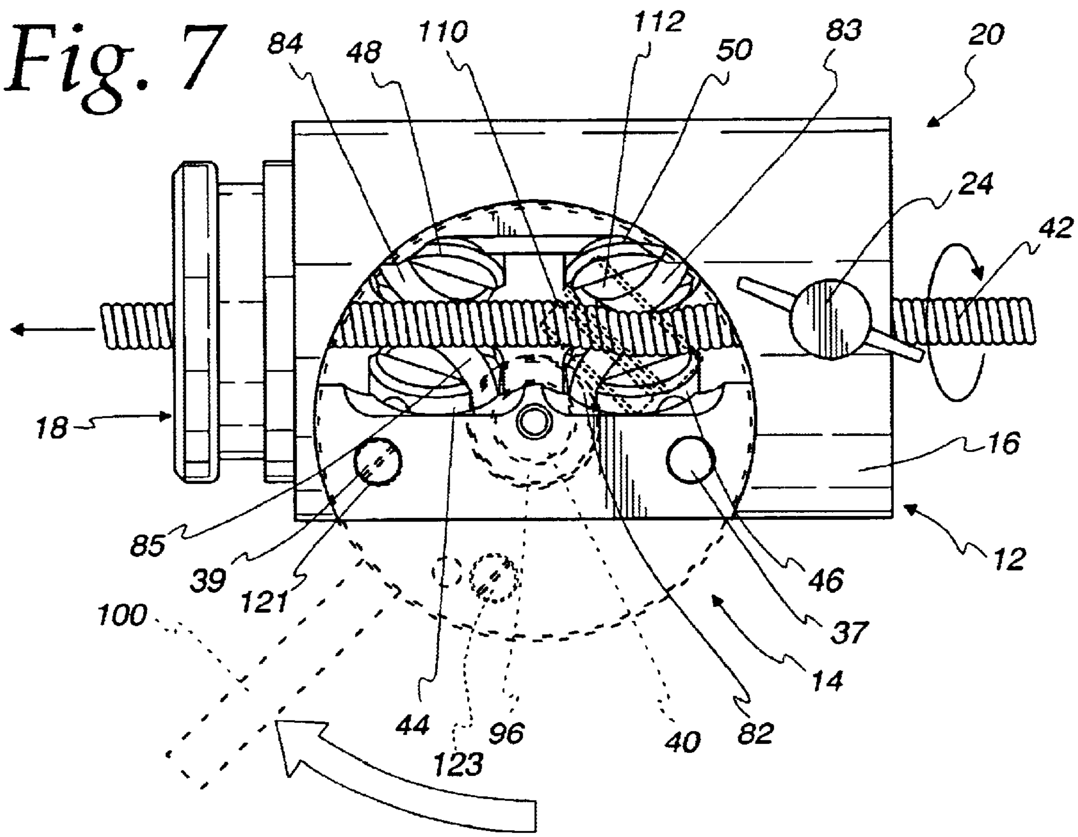
FIG. 7 is a top view of the dual directional power feed with the cap in the forward position and a threaded cable located therein.
Figure 8:
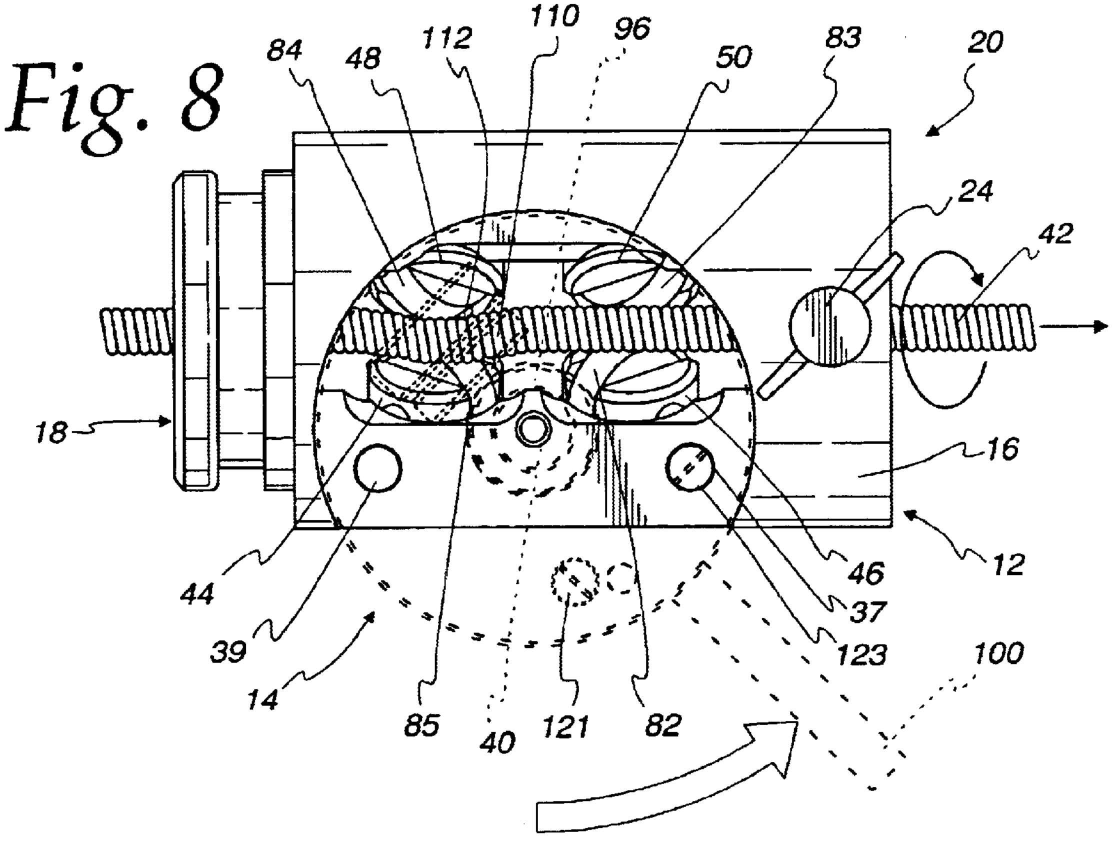
FIG. 8 is a top view of the dual directional power feed with the cap in the reverse position and a threaded cable located therein.

The housing 16 has a cap cutout 32 for attaching the cap assembly 14 to the housing 16. The housing 16 has a rod hole 34 located in an inner surface 36 of the cap cutout 32. The rod hole 34 as shown is ¾ of an inch deep, ¼ of an inch in diameter, and threaded for attaching a threaded rod 38. The threaded rod 38 is secured within the rod hole 34 with an adhesive such as the adhesive sold under the trademark Loctitet® Liquid Threadlockers, or similar binding product. The threaded rod 38 is used for securing the cap assembly 14 to the housing 16 using an adjusting knob 40. In addition to securing the cap assembly 14 to the housing 16, the adjusting knob 40 regulates the speed at which a threaded cable 42, as shown in FIGS. 7 and 8, may be fed through the power feed device 10.

Additionally, two stop engaging holes (not shown) are located in the inner surface 36 of the cap cutout 32. A reverse drill bushing 37 and a forward drill bushing 39 can be tapped or pressed into the stop engaging holes. The drill bushings 37 and 39 can be constructed from hardened steel or similar wear resistant material. The stop engaging holes and the drill bushings 37 and 39 are part of a positive stop mechanism formed between the cap assembly 14 and the housing 12 as described below. Alternatively, the stop engaging holes can be used without the drill bushings 37 and 39. However, the drill bushings 37 and 39 are used to prevent grooves from forming around the stop engaging holes due to wear from the positive stop mechanism.

Four wheel carrier assemblies 44, 46, 48, and 50 are mounted within four wheel carrier assembly holes 52, 54, 56, and 58 within the housing 16. The wheel carrier assemblies 44, 46, 48, and 50 are secured within the holes 52, 54, 56, and 58 by four internal snap rings 60, 61, 62, and 63 that mount within four grooves 64, 65, 66, and 67 located within the wheel carrier assemblies 44, 46, 48, and 50. Each of the wheel carrier assembly holes 52, 54, 56, and 58 includes a locating notch 68, 70, 72, and 74 for mounting the wheel carrier assemblies 44, 46, 48, and 50 within the housing 16 at a predetermined angle. In the embodiment illustrated in FIGS. 1 and 2, the wheel carrier assemblies 44, 46, 48, and 50 are mounted at forty-five degree angles. The selection of the mounting angle will be discussed below.

Figure 3:
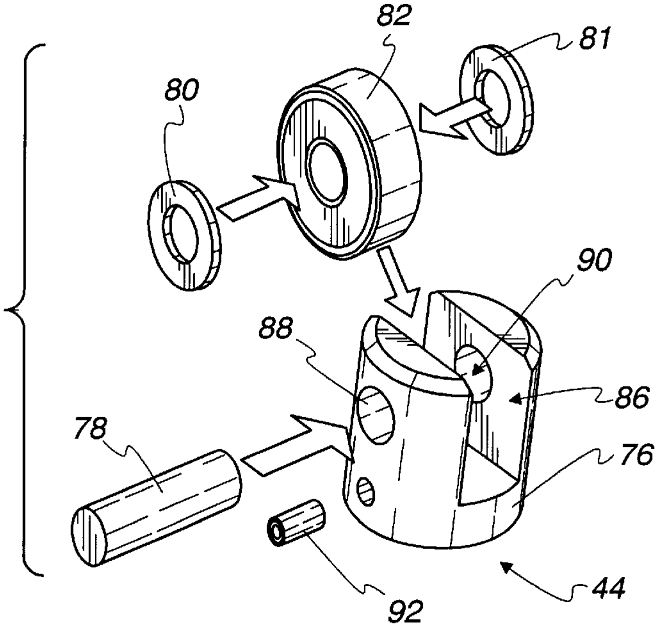
FIG. 3 is an exploded perspective view of a wheel carrier assembly.

As shown in FIG. 3, each wheel carrier assembly 44, 46, 48, and 50 has a wheel housing 76, an axle 78, two washers 80 and 81, and a wheel bearing 82. The wheel housing 76 is generally a solid cylinder with a wheel cutout 86 and two axle mounting holes 88 and 90. Additionally, the wheel housing 76 includes a locating piece 92 extending from the generally cylindrical form for use in conjunction with a locating notch 68, 70, 72, and 74 for mounting the wheel carrier assembly 44, 46, 48, and 50 within the housing 16 at a predetermined angle as described above. In the embodiment shown, the wheel housing 76 is formed of brass, however the wheel housing 76 may be formed of another material apparent to one skilled in the art.

Figure 4:
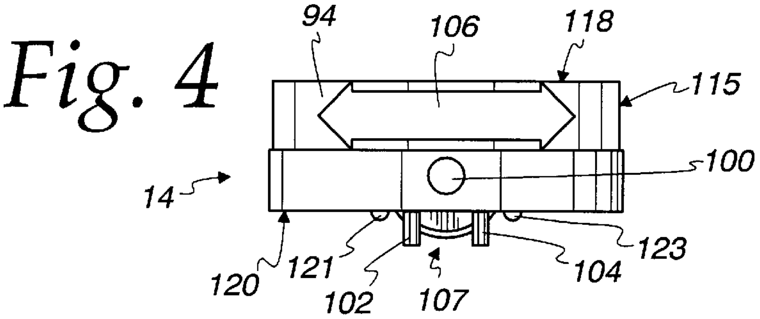
FIG. 4 is a front view of a cap.
Figure 5:
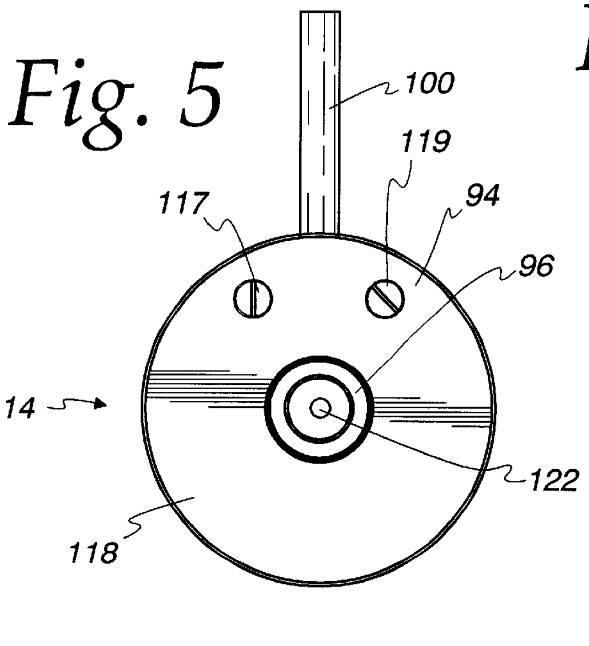
FIG. 5 is a top view of the cap.
Figure 6:
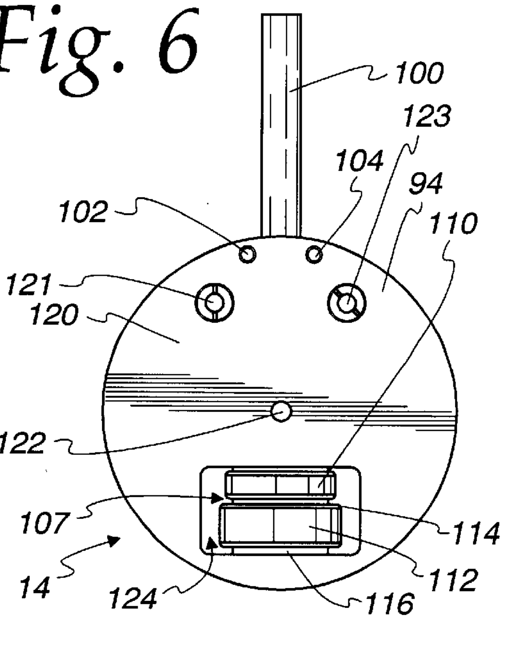
FIG. 6 is a bottom view of the cap.

Referring now to FIGS. 4, 5, and 6, the cap assembly 14 includes a cap 94, a thrust bearing 96, a biasing bearing axle 98 (FIGS. 1 and 2), a cap rotating lever 100, two roll pins 102 and 104, a switch direction indicator 106, a cable guide assembly 107, a forward stop 121, and a reverse stop 123. The cable guide assembly 107 further includes a cable roller guide 110, a biasing bearing 112, and two flat washers 114 and 116.

The cap 94 has a top surface 118, a side surface 115, and a bottom surface 120. A rod hole 122 extends from the top surface 118 to the bottom surface 120, through the center of the cap 94. The rod hole 122 is used to mount the cap assembly 14 to the housing assembly 12. Referring to FIG. 5, the thrust bearing 96 is mounted within the portion of the rod hole 122 closest to the top surface 118 of the cap 94.

The cap 94 is mountable within the cap cutout 32 of the housing 16 by fitting the threaded rod 38 through the rod hole 122 in the cap 94. The cap 94 is then secured to the housing 16 by screwing the adjusting knob 40 onto the portion of the threaded rod 38 extending from the top surface 118 of the cap 94.

As shown in FIG. 6, the bottom surface 120 of the cap 94 includes a cable guide assembly cutout 124. The biasing bearing axle 98 is mounted through the cutout 124, generally along the radius of the cap 94. The cable guide assembly 107 is mounted to the biasing bearing axle 98 (FIGS. 1 and 2) within the cable guide assembly cutout 124 such that a portion of the cable guide assembly 107 protrudes beyond the bottom surface 120 of the cap 94, as shown in FIG. 4. The mounting configuration of the cable guide assembly 107 is designed to engage the threaded cable 42 as described below.

Now referring to FIG. 5, the cap rotating lever 100 is mounted radially into the side surface 115 of the cap 94. The cap rotating lever 100 extends outwardly from the side surface 115 of the cap 94 such that an operator can rotate the cap assembly 14 within the cap cutout 32 as described below.

As shown in the side view of the cap 94 in FIG. 4, the two roll pins 102 and 104 are mounted into the bottom surface 120 of the cap 94 such that the roll pins 102 and 104 prevent the cap assembly 14 from exceeding a predetermined degree of rotation in either direction. The switch direction indicator 106 is located above the cap rotating lever 100 and is used to indicate the direction the threaded cable 42 will feed through the power feed device 10 when the cap assembly 14 is rotated in either direction as will be described below.

The cap 94 has a forward stop locating hole 117 and a reverse stop locating hole 119 extending from the top surface 118 to the bottom surface 120 of the cap 94 on either side of the cap rotating lever 100. The stop locating holes 117 and 119 may or may not be threaded holes. The stop locating holes 117 and 119 may or may not extend through the top surface 118 of the cap 94. Further, the stop locating holes 117 and 119 may be configured in any other manner apparent to one skilled in the art.

A forward stop 121 and a reverse stop 123 are located in the portions of the corresponding stop locating holes 117 and 119 closest to the bottom surface 120 of the cap 94. The stops 121 and 123 extend beyond the bottom surface 120 of the cap 94 such that the stops 121 and 123 can engage the drill bushings 37 and 39 to form an engagement mechanism between the cap assembly 14 and the housing 12. The stops 121 and 123 can be ball-nose spring plungers that are threaded into the corresponding stop locating holes 117 and 119 such that the ball-nose portion of the stops 121 and 123 can engage the drill bushings 37 and 39. Similarly, the stops 121 and 123 may be any other engagement device apparent to one with skill in the art capable of being utilized in conjunction with the drill bushings 37 and 39 to form a positive stop mechanism as described below.

Now referring to FIG. 7, with the cap assembly 14 mounted to the housing assembly 12 and rotated to the forward position, the biasing bearing 112 of the cable guide assembly 107 engages the threaded cable 42 such that the threaded cable 42 is engaged by the biasing bearing 112 and the two wheel bearings 82 and 83 of the two wheel carrier assemblies 46 and 50 located nearest the female end 20 of the housing 16. In this position, clockwise rotation of the threaded cable 42, from the perspective of one looking along the axis of the threaded cable 42 towards the female end 20 of the housing 16, causes the wheel bearings 82 and 83 to rotate towards the male end 18 of the housing 16 and thereby causes the threaded cable 42 to move along its longitudinal axis towards the male end 18 of the housing 16.

Similarly, as shown in FIG. 8, with the cap assembly 14 mounted to the housing assembly 12 and rotated to the reverse position, the biasing bearing 112 of the cable guide assembly 107 engages the threaded cable 42 such that the threaded cable 42 is engaged by the biasing bearing 112 and the two wheel bearings 84 and 85 of the two wheel carrier assemblies 44 and 48 located nearest the male end 18 of the housing 16. In this position, clockwise rotation of the threaded cable 42, from the perspective of one looking along the axis of the threaded cable 42 towards the female end 20 of the housing 16, causes the wheel bearings 84 and 85 to rotate towards the female end 20 of the housing 16 and thereby causes the threaded cable 42 to move along its longitudinal axis towards the female end 20 of the housing 16.

The cable roller guide 110 prevents the threaded cable 42 from locking up and bunching behind the biasing bearing 112 when the cap assembly 14 is rotated between the forward position and the reverse position. When the biasing bearing 112 disengages the threaded cable 42, the cable roller guide 110 limits the movement of the threaded cable 42 and allows the biasing bearing 112 to properly reengage the threaded cable 42 when the cap assembly 14 is rotated towards the forward or reverse position.

The speed of translation of the threaded cable 42 in the forward and rearward directions can be varied by the amount of pressure the biasing bearing 112 exerts on the threaded cable 42. Increasing the pressure the biasing bearing 112 exerts on the threaded cable 42, increases the translation speed of the threaded cable 42 by decreasing the slippage that may occur between the biasing bearing 112 and the threaded cable 42. Conversely, decreasing the pressure the biasing bearing 112 exerts on the threaded cable 42 decreases the speed of translation of the threaded cable 42 by increasing the amount of slippage that may occur between the biasing bearing 112 and the threaded cable 42.

The amount of pressure the biasing bearing 112 exerts on the threaded cable 42 can be controlled by two mechanisms of the embodiment of the power feed device 10 illustrated in FIGS. 7 and 8. First, the adjusting knob 40 can be used to control the pressure the biasing bearing 112 exerts on the threaded cable 42. Second, the cap assembly 14 position can control the pressure the biasing bearing 112 exerts on the threaded cable 42.

Tightening the adjusting knob 40 increases the pressure the biasing bearing 112 exerts on the threaded cable 42. Conversely, loosening the adjusting knob 40 decreases the pressure the biasing bearing 112 exerts on the threaded cable 42. Additionally, the cap assembly 14 may be rotated to the forward position, the reverse position, or any position in between. As the cap assembly 14 rotates further towards the forward or reverse position, the biasing bearing 112 exerts more pressure on the threaded cable 42. Thus, the further towards the forward or reverse position the cap assembly 14 is rotated, the faster the speed of translation of the threaded cable 42 in either the forward or reverse direction, respectively. The thrust bearing 96 is implemented between the adjusting knob 40 and the cap 94 to allow the cap assembly 14 to be rotated between the forward position and the reverse position without affecting the tightness of the adjusting knob 40. Accordingly, an operator may use the tightness of the adjusting knob 40, the degree of rotation of the cap assembly 14, or a combination of both to control the speed of translation of the threaded cable 42.

The stops 121 and 123 and the drill bushings 37 and 39 work together to provide a positive stop mechanism that engages the cap assembly 14 in either the forward or the reverse position with respect to the housing 16. The positive stop engagement is capable of holding the cap assembly 14 in either the forward or reverse position against the force of the vibrations that occur during the normal operation of the device 10. However, the positive stop engagement is also capable of being easily disengaged by an operator intending to rotate the cap assembly 14 around the axis of the threaded rod 38 away from the position of engagement to any other position.

For example, an operator may rotate the cap assembly 14 to the forward position until the forward stop 121 engages the forward drill bushing 39. Similarly, an operator may rotate the cap assembly 14 to the reverse position until the reverse stop 123 engages the reverse drill bushing 37. In the engaged forward and reverse positions, the cap assembly 14 is secured in position by the positive stop formed by the stops 121 and 123 and the drill bushings 37 and 39. However, an operator may disengage the positive stop mechanism by applying force to the cap rotating lever 100 in the direction the operator would like to rotate the cap assembly 14.

As shown in FIGS. 9, 11, and 13, a bearing and support assembly 125 comprising a bearing 126 and the support plate 28 can be configured for various mounting configurations. For example, the bearing and support assembly 125 can be used to couple the power feed device 10 to a power unit the power unit may rotate without causing the power feed device 10 to rotate as well, as shown in FIGS. 11 and 13. Alternatively, the bearing and support assembly 125 can be used to couple the power feed device 10 to a power unit whereby both the power unit and the power feed device 10 may rotate independently of each other, as shown in FIG. 9.

FIG. 9 illustrates a system in which the power feed device 10 may be implemented. As shown in FIG. 9, the power feed device 10 is coupled to a guide hose assembly 26, which is coupled to the bearing 126, which is coupled to a drum assembly 128. The guide hose assembly 26 includes a power feed collar 130, which is coupled to a first hose barb 132, which is coupled to a conduit 134, which is coupled to a second hose barb 136, which is coupled to a guide hose sleeve assembly 138. As described above with reference to FIG. 2, the thumbscrew 24 operates through the screw hole 30 in the female end 20 of the housing 16 to secure the power feed device 10 to the guide hose assembly 26. In the embodiment shown in FIG. 9, the thumbscrew 24 couples the female end 20 of the housing 16 to the power feed collar 130.

As shown in FIG. 10, the power feed collar 130 is a cylindrical tube with an up interior diameter A and an exterior diameter B. The exterior. diameter B of the power feed collar 130 as shown is approximately 4/100 of an inch smaller than the interior diameter 21 of the housing 16 allowing the power feed collar 130 to be inserted into the female end 20 of the housing 16. There is a channel 146 in the power feed collar 130 for engaging the thumbscrew 24 to secure the power feed collar 130 to the housing 16. The channel 146 as shown is approximately 1/10 of an inch deep and approximately 6/16 of an inch wide. The power feed collar 130 is preferably constructed from an engineering plastic such as the acetal resin sold under the trademark Delrin®. The power feed collar 130 is coupled to the conduit 134 by the first hose barb 132.

As shown in FIG. 9, the guide hose assembly 26 couples to the bearing 126, which is coupled to the drum assembly 128. The bearing 126 allows the drum assembly 128 to rotate without causing the guide hose assembly 26 to rotate as well. Additionally, the bearing 126 allows the guide hose assembly 26 to rotate independently of any drum assembly 128 rotation. Allowing the guide hose assembly 26 to rotate independently of the drum assembly 128 provides an important safety feature for an operator in situations where the threaded cable 42 snags. In such a situation, the guide hose assembly continues to rotate independently of any rotation by the snagged threaded cable 42 and the drum assembly 128.

FIG. 11 illustrates another system in which the power feed device 10 may be implemented. As shown in FIG. 11, the guide hose assembly 26 is coupled to the male end 18 of the power feed device 10, which is coupled to the support plate 28, which is coupled to the drum assembly 128.

Figure 12:
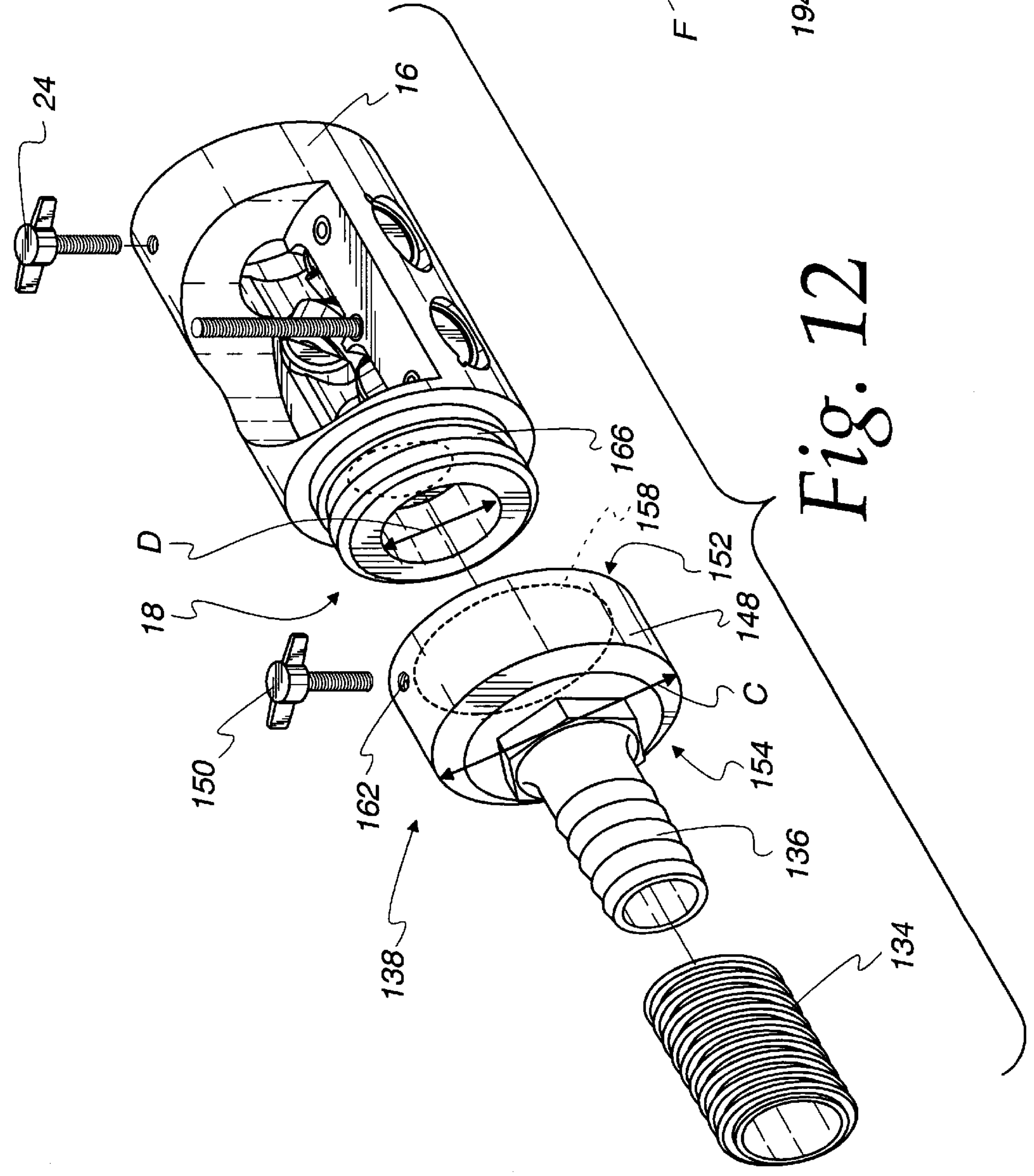
FIG. 12 is a partially exploded perspective view of the dual direction power feed and a guide hose sleeve of a guide hose.

As shown in FIG. 12, the guide hose sleeve assembly 138 includes a guide hose sleeve 148 and a thumbscrew 150. The guide hose sleeve 148 has a first end 152, a second end 154, an exterior diameter C, an annular wall 158, and a screw hole 162. The thumbscrew 150 operates through the screw hole 162 in the guide hose sleeve 148. The thumbscrew 150 screws through the screw hole 162 and extends through the annular wall 158 of the guide hose sleeve 148. The thumbscrew as shown is approximately ¼ of an inch in diameter. The guide hose sleeve assembly 138 is coupled to the conduit 134 by the second hose barb 136.

Similar to the description of the coupling of the female end 20 of the housing 16 to the power feed collar 130 above, the thumbscrew 150 couples the first end 152 of the hose sleeve 148 to the male end 18 of the housing 16. The male end 18 of the housing 16 is configured to provide an exterior diameter D and a channel 166 for coupling to the first end 152 of the guide hose sleeve 148. The exterior diameter D of the male end 18 of the housing 16 as shown is approximately 4/100 of an inch smaller the diameter of the annular wall 158 of the guide hose sleeve 148, allowing the male end 18 of the housing 16 to be inserted into the first end 152 of the guide hose sleeve 148. The channel 166 provides a surface for engaging the thumbscrew 150 to secure the housing 16 to the guide hose sleeve 148, thus securing the power feed device 10 to the guide hose assembly 26. The channel as shown is approximately ¼ of an inch in depth and approximately 3/10 of an inch in width.

As shown in FIG. 13, the female end 20 of the housing 16 of the power feed device 10 couples to the support plate 28. The support plate 28 includes a guide tube 168, a guide tube plate 170, a bushing 172 (FIG. 14), and a spring pin 174. The thumbscrew 24 of the power feed device 10 couples the female end 20 of the housing 16 to the guide tube 168. The guide tube 168 is a cylindrical tube with an interior diameter E, a mounting diameter F (FIG. 14), and an exterior diameter G. The exterior diameter G of the guide tube 168 as shown is approximately 4/100 of an inch smaller than the inside diameter of the housing 16 allowing the guide tube 168 to be inserted into the female end 20 of the housing 16. There is a channel 184 in the guide tube 168 for engaging the thumbscrew 24. The channel 184 as shown is approximately 1/10 of an inch deep and approximately 5/16 of an inch wide. The guide tube 168 is preferably constructed from aluminum.

A spring pin 174 is mounted to the channel 184 of the guide tube 168. The spring pin 174 engages the guide tube notch 25 when the guide tube 168 is inserted into the female end 20 of the housing 16. When engaged, the connection between the spring pin 174 and the guide tube notch 25, as well as the connection between the thumbscrew 24 and the channel 184 of the guide tube 168, prevent the power feed device 10 from rotating around a longitudinal axis 188 passing through the center of the guide tube 168 and the power feed device 10.

Figure 14:
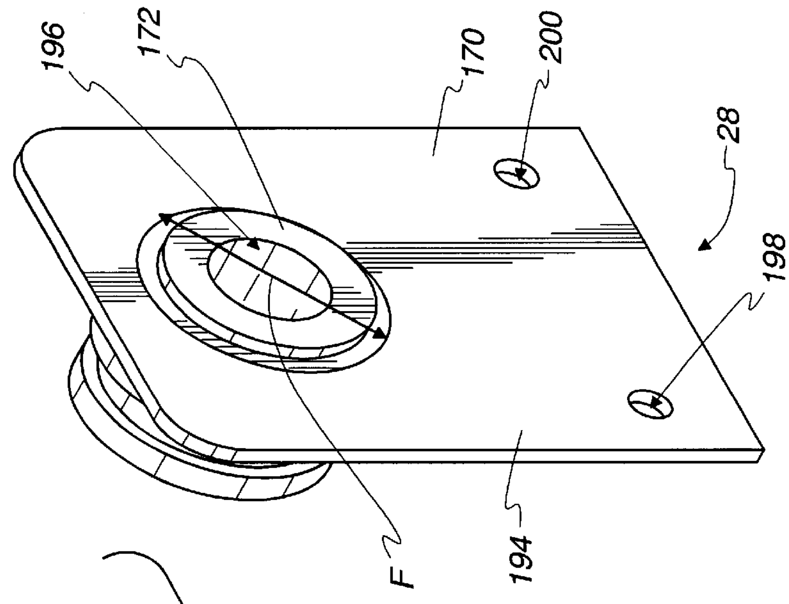
FIG. 14 is a back perspective view of the support plate.

As shown in FIG. 14, the mounting diameter F of the guide tube 168 is designed for mounting the guide tube 168 to a guide tube plate 170. The guide tube plate 170 is generally rectangular, with a front surface 192 (FIG. 13), a back surface 194, and three holes passing from the front surface 192 to the back surface 194; a guide tube mounting hole 196, and two frame mounting holes 198 and 200. Additionally, a bushing 172 attaches to the interior diameter E of the guide tube 168 for reducing friction in the connection between the support plate 28 and the drum assembly 128. In the embodiment shown in FIG. 14, the bushing is press fit into the guide tube 168.

As shown in FIG. 13, the guide tube 168 is welded to the guide tube plate 170 such that the mounting diameter F of the guide tube 168 fits into the guide tube mounting hole 196. The guide tube plate 170 is preferably constructed from aluminum and the bushing 172 is preferably constructed from bronze. The guide tube plate 170 attaches to a frame 204 of the drum assembly 128 using a thumbscrew and washer or similar securing means passing through the frame mounting holes 198 and 200. Mounting the guide tube plate 170 to the frame 204, as described above, prevents the guide tube plate 170, and any device attached thereto, from rotating around the longitudinal axis 188.

In both of the mounting configurations shown in FIGS. 11 and 13 a drum assembly 128 is shown coupled to the power feed device 10. The drum assembly 128 shown in FIGS. 11 and 13 includes a drum 206 for rotating a threaded cable 42 clockwise through the power feed device 10. A length of threaded cable 42 is stored within the drum assembly 128 for use with the power feed device 10. The drum assembly 128 rotates the threaded cable 42 in a clockwise rotation, from the perspective of one looking along the axis of the threaded cable 42 towards the female end 20 of the housing 16. As described above with reference to FIGS. 7 and 8, depending upon the position of the cap assembly 14 with respect to the housing assembly 12, the length of threaded cable 42 will translate longitudinally either into or out of the drum 206. An operator may choose the direction the threaded cable 42 translates by rotating the cap assembly 14 between a forward and a reverse position.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A power feed device for use with a threaded cable comprising:

a housing, said housing having a first end and a second end and a longitudinal bore through which the cable can pass;

a first and second pair of wheel bearings rotatably mounted to said housing;

a biasing bearing rotatably mounted within said housing, wherein said biasing bearing can be positioned in a first position wherein said biasing bearing and said first pair of wheel bearings engage the cable whereby rotation of the cable in a first direction causes the cable to translate in a first longitudinal direction, and said biasing bearing can be positioned in a second position wherein said biasing bearing and said second pair of wheel bearings engage the cable whereby rotation of the cable in a first direction causes the cable to translate in a second longitudinal direction, opposite said first longitudinal direction.

2. The power feed device of claim 1 wherein each of said wheel bearings comprises:

a wheel housing;

an axle mounted to said wheel housing; and a wheel bearing rotatably mounted to said axle.

3. The power feed device of claim 1 wherein said first end of said housing is configured for coupling said power feed device to another device.

4. The power feed device of claim 3 wherein said first end of said housing further comprises a thumb screw hole and a thumb screw operating through said thumb screw hole for securing said housing to another device.

5. The power feed device of claim 1 further comprising:

a cap rotatably mounted to said housing;

a bearing axle mounted to said cap; and said biasing bearing is rotatably mounted to said bearing axle.

6. The power feed device of claim 5 wherein said cap further comprises a cap rotation lever mounted to said cap for an operator to rotate said cap with respect to said housing.

7. The power feed device of claim 5 wherein said cap further comprises at least one roll pin mounted to said biasing cap wherein said roll pin limits the rotation of said cap relative to said housing.

8. The power feed device of claim 5 wherein said housing further comprises at least one stop engaging hole and said cap further comprises at least one stop for engaging said stop engaging hole.

9. The power feed device of claim 8 wherein said stop engaging hole further comprises a drill bushing located within said stop engaging hole.

10. The power feed device of claim 8 wherein said stop further comprises a ball-nose spring plunger.

11. The power feed device of claim 5 wherein said cap further comprises a cable roller guide rotatably mounted to said bearing axle.

12. The power feed device of claim 11 wherein said cap further comprises an adjusting knob for securing said cap to said housing.

13. The power feed device of claim 12 further comprising a threaded rod mounted to said housing for securing said cap and said adjusting knob to said housing.

14. The power feed device of claim 13 wherein said cap further comprises a thrust bearing mounted to said cap for operation with said adjusting knob.

15. The power feed device of claim 1 wherein said second end of said housing is configured for coupling said power feed device to another device.

16. The power feed device of claim 1 wherein the speed of translation of the cable through said housing is controlled by the amount of pressure said biasing bearing exerts on the cable.

17. The power feed device of claim 16 wherein the amount of pressure said biasing bearing exerts on the cable is controlled by an adjusting knob.

18. The power feed device of claim 16 wherein the amount of pressure said biasing bearing exerts on the cable is controlled by the degree of rotation of said biasing bearing towards said first position or said second position.

19. A power feed device for use with a threaded cable comprising:

a housing, a first pair of wheel bearings rotatably mounted to said housing;

a second pair of wheel bearings rotatable mounted to said housing; and means for selectively engaging said first and said second pair of wheel bearings wherein said means for selectively engaging said first and said second pair of wheel bearings may be positioned to bias the cable against said first pair of wheel bearings such that rotation of the cable about its longitudinal axis causes the cable to translate along its longitudinal axis in a first direction, and said means for selectively engaging said first and said second pair of wheel bearings may be positioned to bias the cable against said second pair of wheel bearings such that rotation of the cable about its longitudinal axis causes the cable to translate along its longitudinal axis in a second direction, opposite said first direction.

20. The power feed device of claim 19 wherein said housing has a first end, said first end of said housing being configured for attaching to another device.

21. The power feed device of claim 19 wherein said housing has a second end, said second end of said housing being configured for attaching to another device.

22. The power feed device of claim 19 wherein said means for selectively engaging said first and said second pair of wheel bearings comprises a cap assembly.

23. The power feed device of claim 19 wherein said means for selectively engaging said first and said second pair of wheel bearings comprises a biasing bearing.

* * * * *